April 5, 1938.   S. H. WHITE   2,113,523
VEGETATION BEARING ARCHITECTONIC STRUCTURE AND SYSTEM
Filed Aug. 18, 1937   3 Sheets-Sheet 1

Inventor
Stanley Hart White
By E. H. Gates
Attorney

April 5, 1938.   S. H. WHITE   2,113,523
VEGETATION BEARING ARCHITECTONIC STRUCTURE AND SYSTEM
Filed Aug. 18, 1937    3 Sheets-Sheet 2
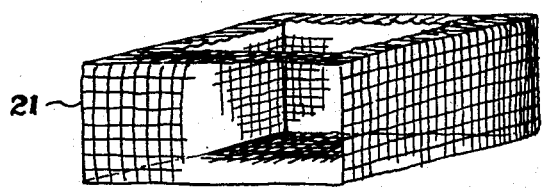
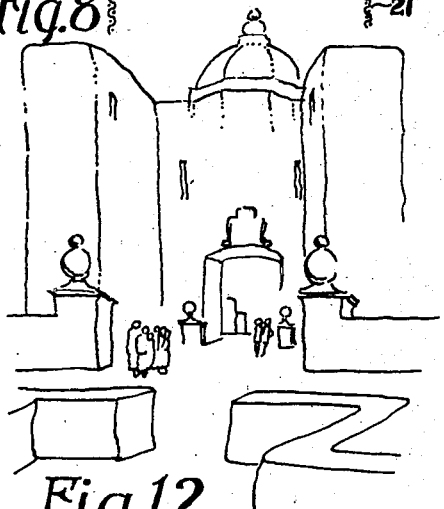
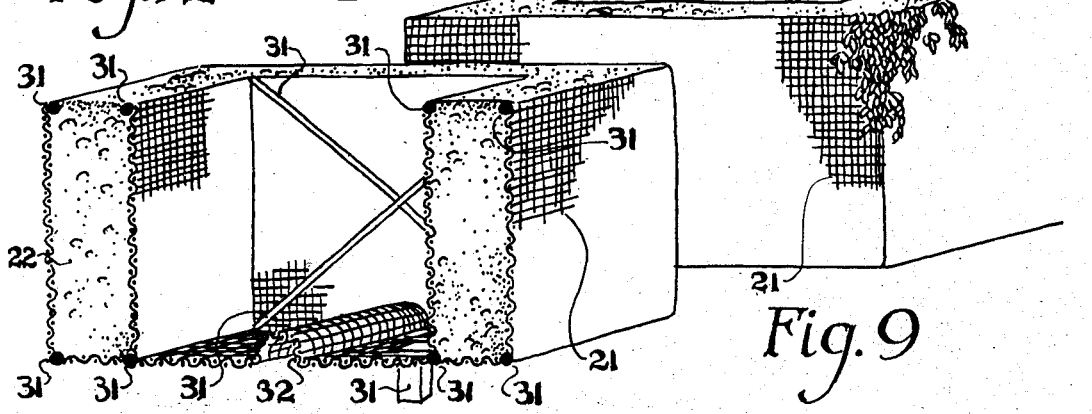
INVENTOR.
Stanley Hart White
BY
ATTORNEY.

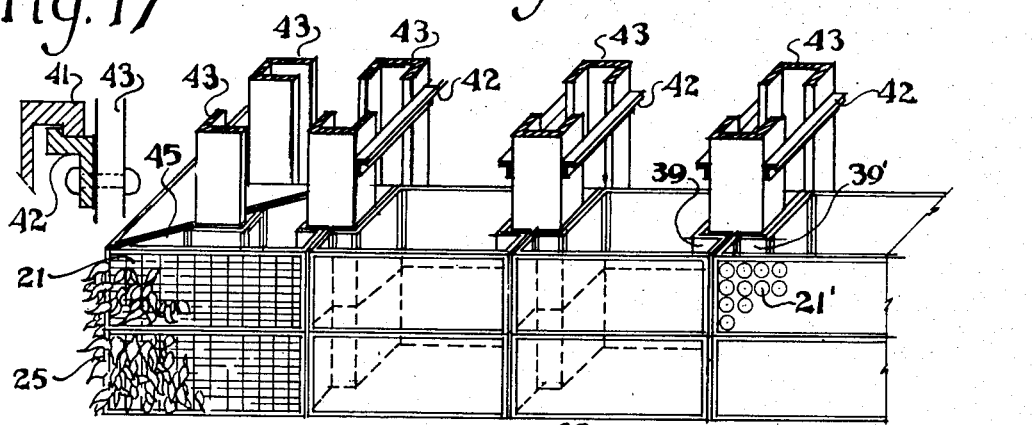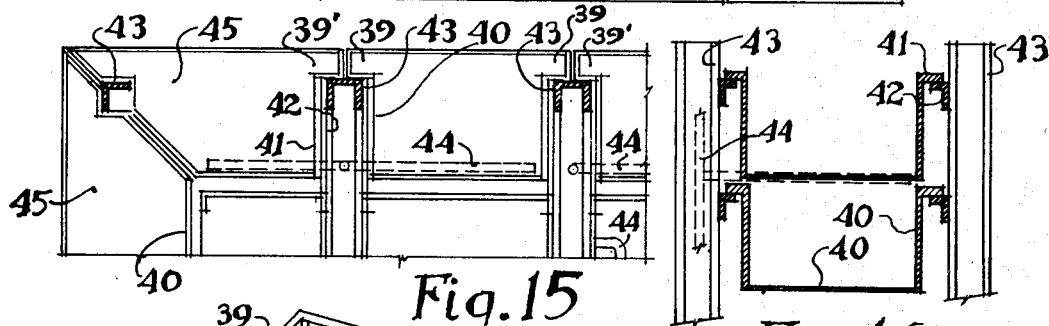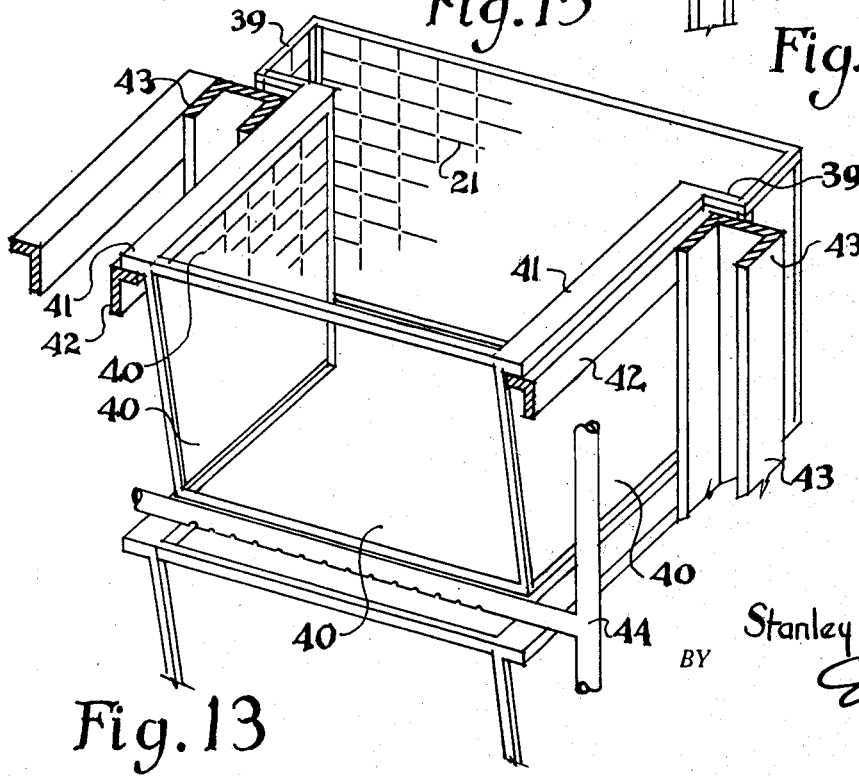

Patented Apr. 5, 1938

2,113,523

UNITED STATES PATENT OFFICE 2,113,523

VEGETATION-BEARING ARCHITECTONIC STRUCTURE AND SYSTEM

Stanley Hart White, Washington, D. C.

Application August 18, 1937, Serial No. 159,789

7 Claims. (Cl. 47—33)

This invention is believed to reveal a new art of vegetation-bearing architectonic structure. It comprehends a structural method with its related structural units and compounds.

A principal object of this invention is to provide a method for producing an architectonic structure of any buildable size, shape or height, whose visible or exposed surfaces may present a permanently growing covering of vegetation. Another object is to provide a vegetation-bearing structural unit therefor. A further object is to provide such a unit that may be irrigatable, portable and interchangeable. Another object is to provide such a unit of sufficient flexibility to enable it to be bent, curved or warped into various shapes. Another object is to provide such a unit that may be permanently plant-bearing and plant-nourishing. A further object is to provide fixed, flexible or portable architectonic compounds of such units. Additional objects will more plainly appear from the detailed specification and drawings presented herewith in exemplification but not in limitation of the present invention.

Like reference characters represent like parts in the drawings which represent diagrammatically in:

Fig. 1, a vertical elevation of a fixed modified compound;

Fig. 2, a vertical cross-section of the modified fixed or portable compound shown in Fig. 1 taken on the center line thereof;

Fig. 3 is a vertical cross-section of the flexible unit shown in Fig. 4 taken on the center line thereof;

Fig. 4, a perspective skeleton view of a flexible fixed or portable unit;

Fig. 5, a perspective skeleton view of a modified fixed or portable flexible unit;

Fig. 6, a perspective detail view of a flexible compound formed of rigid units;

Fig. 7, a perspective skeleton view of a portable hollow unit;

Fig. 8, a vertical cross-section detail of the unit shown in Fig. 7 taken on the center line thereof;

Fig. 9, a modified form of the unit shown in Fig. 7;

Fig. 10, a vertical cross-section detail of the unit shown in Fig. 9, showing bracing and draining means;

Fig. 11, a compound of portable units;

Fig. 12, a perspective of a complex compound formed of the herein described units;

Fig. 13, a perspective skeleton view from the rear of a portable, removable, irrigatable and drainable unit;

Fig. 14, a perspective skeleton view of a compound of the units shown in Fig. 13;

Fig. 15, a plan detail of the compound shown in Fig. 14;

Fig. 16, a vertical cross-sectional view of the supports and units of the compound shown in Fig. 14; and Fig. 17, a vertical cross-sectional detail view of means for engaging corner section units shown in Fig. 14 at 45.

The underlying principle of the present invention is to provide the architectural profession and related industries with an efficient and inexpensive method and means for utilizing a novel medium for ornamental and useful architectonic construction, in various forms of units and compounds having vegetation-bearing surfaces. For example one purpose of these surfaces may be to build decorative backgrounds or screens for masking eyesores or for concealing people or properties in such a way as to avoid painted camouflage or the heavy cost of ordinary hedges or camouflage, and to achieve these results, either in a few days, if permanently constructed, or in a few hours or even minutes if built up of the hereindescribed portable units.

The essential idea therefore is to avoid planting the growing material in the open ground or in ordinary pottery containers or boxes which are heavy and cumbersome and to provide instead (a) a wall enclosed by reticular material supported by reinforcing members, (b) a wall or compound built up of units of reticular material so that the structure would stand like a dry wall of masonry, or (c) a wall or compound built of interfitting portable and replaceable reticular units in a skeleton supporting frame designed to control the shape and dimensions of the completed compound.

The vegetation may be of a kind best suited for the effect desired, and the soil or compost may be of the proper chemical and physical nature to best suit the chosen vegetation to be grown, but whenever reduction in weight is desirable various synthetic composts and synthetic nutriments may be employed. Thus, the soil substitute or compost for vegetation growth may be made with any of the mineral fibers used for insulating purposes or any other suitable substance of low specific gravity to take the place of the relatively inert mineral soil particles of natural earth. To this may be added humus of any standard or modified form and the chemical nutrients required for plant growth, in addition to which may be mixed or injected into the compost any of the conditioners of organic growth whether chemical (inorganic or organic), bacteriological, symbiotic, enzymatic, hormonic, or in any other way conducive to plant growth and development.

It is apparent that such special preparation of the soil whether definitely intended to decrease the specific gravity of the compost or to increase or prolong the life-sustaining properties of the compost is a complementary element of the present invention. However, it is equally apparent that the herein described invention may readily be embodied in various forms of compounds and units and methods of construction that may readily employ ordinary soil.

The vegetation in its final positions has its roots within the compost while the tops of the vegetation would extend through the reticular surfaces of the units or compounds into the open air where their normal development occurs. Irrigating, draining and compost renewal means are provided within the units and compounds as will be hereinafter described.

Another feature of the present invention is that its vegetation-bearing surfaces may readily and momentarily be changed by the removal or substitution of a whole or a part of a unit either large or small. No limit of height is imposed on the present embodiments of the invention short of that obtainable by existing structural and architectural engineering, making possible endless dramatic and fanciful forms suitable for expositions, stagecraft and other pageants. Another modification of the present invention is that wherein the containing units or compounds are pliable enough for the whole unit or compound to be bent into curved or warped shapes, thus making the present invention applicable and extending its usefulness to many different needs including military camouflage and dramatic or cinematic stagecraft. It is further apparent that the herein described novel vegetation-bearing surfaces are readily adaptable to other structures or to receive other structures or devices, either useful or decorative into their units or compounds.

In Fig. 1 is shown a vertical elevation of a modified compound of the herein described structural units wherein the reticular units are shown at 21, the compost contained therein at 22 and the vegetation at 25 growing through the reticular material 21.

Figure 2 shows a vertical cross section of a modified form of the fixed compound shown in Fig. 1 exemplifying the formation of such unit into a natural or fanciful form such as for instance a tree of any design, dimension or shape. This form may be either fixed or portable and may be formed as a compound. In Fig. 2 the supporting and reinforcing framework is shown at 28, the compost at 22, the reticular surface at 21, irrigating means at 23, the roots at 24 and the vegetation at 25.

Fig. 3 shows a vertical cross section of the flexible unit shown in Fig. 4 taken on the center line thereof, wherein the reticular material is shown at 21, the compost at 22, the vegetation at 25 and the roots at 24.

A flexible unit is shown in perspective in Fig. 4, and may be preferably formed as a mattress-shaped structure shown therein but is not limited to this shape or to any dimensions. This unit may be constructed entirely of reticular material 21 with or without reinforcing means. Enclosed therein is the compost 22 and growing therethrough is the vegetation 25. A flexible unit in one of many possible curved or warped positions is shown in Fig. 5.

Fig. 6 represents a perspective view of an interhinging means that may be employed in the assembly or compounding of many of the herein described units.

Fig. 7 exemplifies a preferred form of a hollow or recessed unit formed of reticular material 21, and Fig. 8 shows a vertical cross section detail of Fig. 7. These hollow units may be formed with or without reinforcing members and may be either rigid or semi-flexible. They may also be used as units or may be interfitted into compounds. Fig. 9 shows a single hollow unit, and Fig. 10 a vertical cross section of the unit shown in Fig. 9 showing reinforcing means 31 and drainage or irrigation means 32. This modification may also be employed either as single units or in compounds of interfitting units.

Fig. 11 exemplifies a preferred form of a compound of the novel units herein described and exemplified in the previously explained figures. These units may be assembled in a manner similar to masonry construction and stabilized or braced by members such as that shown at 33. A front view of a compound unit is shown at 34, a rear view at 35, a lateral view at 36, a top view at 37, and a soffit view at 38.

Fig. 12 represents a front elevation of one of the unlimited varieties of complex compounds made possible by the present invention, and gives some idea of the unlimited shape and vast scope of dimension afforded by this invention to the craftsman and the architect.

Fig. 13 represents a perspective skeleton view shown from the rear of a novel portable unit that may also be removable, irrigatable, drainable and replaceable. This type of unit is preferred for the formation of the larger or more complex compound. This unit may be formed wholly or partly of reticular material 21, and is preferably formed with an overlapping front surface as shown at 39. It may be provided with side walls 40 and slide members 41 preferably positioned at the top of the unit and which engage interfitting slide members 42 embodied in the compound's structural support 43. Drainage and/or irrigation means such as shown at 44 may also be provided.

Fig. 14 shows a perspective view of a section of a compound formed of the unit shown in Fig. 13 and a modified form of these units suitable for corner sections are shown at 45.

Fig. 15 shows a detail plan view of the compound shown in Fig. 14.

Fig. 16 shows a vertical cross sectional view of supports and slides of the unit shown in Fig. 13 and Fig. 17 shows a vertical cross-sectional detail of the corner member sliding and attaching means for the corner unit members shown at 45 in Fig. 14.

The unit shown in Fig. 13 may be charged with a natural or synthetic compost and provided with vegetation rooted therein and growing through and covering the front and/or other surfaces of the member 39. They may then be slidably interfitted into the support of the compound by means of the slide members 41 and 42 so that the member 39 will overlap the support 43 and abut the adjacent surface of the adjacent unit 39'. In this way an unbroken surface of vegetation may be provided for the compound even though any or all units may be replaced, renewed or interchanged, if so desired. The irrigation means 44 may also be used for the injection of plant nutriments and conditioners into the units or into the compound as a whole.

Figure 1:
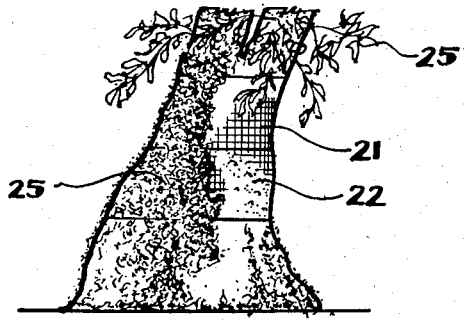
Figure 2:
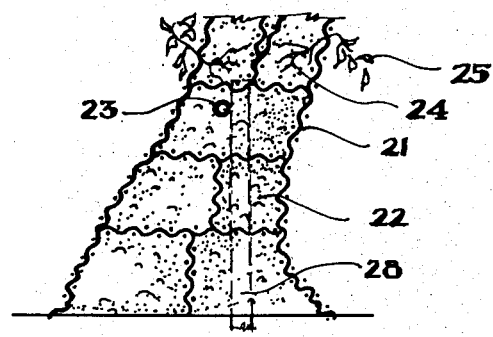
Figure 3:
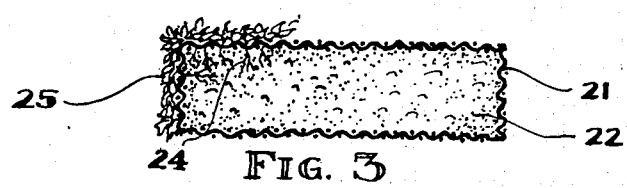
Figure 4:
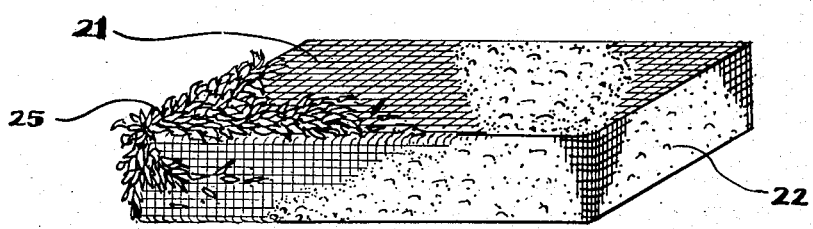
Figure 5:
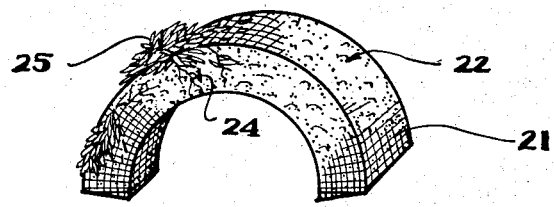
Figure 6:
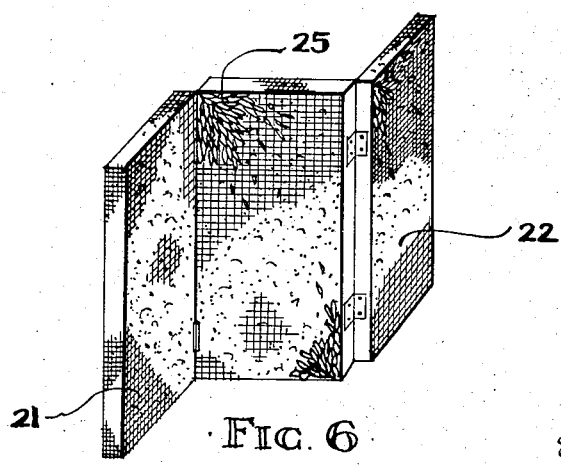

It is apparent that various materials are available for the structure and support of each of the herein described units and modifications thereof and compounds, such as are already well known in the building industry. The reticular surfaces herein described are preferably formed of expanded metal or perforated rust-proof metal sheets, perforated plastic sheets and a variety of other well known materials that are preferably water-proof and readily perforated or meshed. For the herein described flexible units it may be preferred to employ a metal mesh-like surface similar to chain-mail or finely woven wire screening. The reticular surfaces may be fine wire screening or expanded metal as shown in Fig. 4, or a coarse-mesh wire screening as shown in Fig. 13, or perforated material as shown at 21' in Fig. 14 or of any other suitable mesh-like material.

The compost herein described may be composed wholly or partly of natural or synthetic material or mixtures thereof with or without the intermittent or subsequent introduction of plant nutrients and conditioners such as already described. Wherein additional reduction in weight of the units is desirable, a preferred constituent of the compost may comprise a process, aerated or "puffed" micaceous material such as vermiculite, that is at present marketed under the trade name of Zonolite. The various plant nutrients and conditioners mentioned herein as well as other varieties available on the market may be mixed with the compost before it is introduced into the structure or it may be injected into the compost through the reticular material or it may be pumped into the structure through the irrigating means herein described.

In the specification and claims the following terms used therein are intended to be defined as follows:

Architectonic: pertaining to the art of landscaping structure as well as to buildings, but distinguished from the art of plant culture.

Compound: a structural assembly of a plurality of structural units.

Reticular material: meshed or perforated sheet material, expanded metal sheets, wire fabric sheets, meshed chain mail fabric.

While the foregoing specification and drawings set forth preferred exemplifications of the present invention it is intended to include all variations and modifications within the spirit and scope of the appended claims.

I claim:

1. The method of building a readily and rapidly assembled and reassembled architectonic compound that includes the steps of fabricating a plurality of light-weight structural units comprising brick-shaped containers formed of non-corrosive reticular material, filling said containers with a plant nourishing and conditioning compost, providing vegetation rooted in said compost and growing through said recticular material and covering the exterior surfaces of said containers, removably assembling said units into a plant wall structure so that they may be capable of presenting an unbroken surface of vegetation over all of the exterior surfaces of said compound.

2. The method of making a readily and rapidly assembled and reassembled self-supporting plant-wall structure that includes the steps of forming a plurality of light-weight structural units consisting of brick-shaped containers of non-corrosive reticular material, filling said containers with plant nourishing and conditioning compost, providing vegetation rooted therein and growing through said reticular material and covering the surfaces of said containers, removably assembling said filled containers so that they may be capable of standing in the manner of a dry wall of masonry, and so that they may be capable of presenting an unbroken surface of vegetation over all of the exterior surfaces of said wall-structure.

3. A readily and rapidly assembled and reassembled architectonic compound comprising a plant-wall structure built of a series of readily removable light-weight structural units, said units comprising brick-shaped containers formed of non-corrosive reticular material and filled with plant nourishing and conditioning compost provided with vegetation rooted therein and growing through said reticular material and covering the surfaces of said containers so that they may be capable of presenting an unbroken surface of vegetation over all of the exterior surfaces of said compound.

4. A readily and rapidly assembled and reassembled architectonic compound comprising a self-supporting plant-wall structure capable of standing in the manner of a dry wall of masonry and built of a series of readily removable lightweight structural units, said units comprising brick-shaped containers formed of non-corrosive reticular material and filled with plant nourishing and conditioning compost provided with vegetation rooted therein and growing through said reticular material and covering the surfaces of said containers so that they may be capable of presenting an unbroken surface of vegetation over all of the exterior surfaces of said compound.

5. A compound of claim 3 in which the structural units are flexible.

6. A compound of claim 3 comprising a combination of flexible and non-flexible structural units.

7. A readily and rapidly assembled and reassembled architectonic compound comprising a plant wall structure consisting of a series of readily removable light-weight flexible structural units, said units comprising mattress-shaped flexible containers formed of reticular material and filled with plant nourishing and conditioning compost provided with vegetation rooted therein, growing through said reticular material and covering the exterior surfaces of said containers so that they may be capable of presenting an unbroken surface of vegetation over all of the exterior surfaces of said compound.

STANLEY H. WHITE.